(12) United States Patent  (10) Patent No.: US 6,594,951 B1
Reynolds  (45) Date of Patent: Jul. 22, 2003

(54) PLANT MOBILIZER

(76) Inventor: Kathleen O. Reynolds, 16227 Elm Rd., Maple Grove, MN (US) 55311

( * ) Notice: Subject to any disclaimer, the term of this patent is extended or adjusted under 35 U.S.C. 154(b) by 0 days.

(21) Appl. No.: 10/147,374

(22) Filed: May 16, 2002

(51) Int. Cl.[7] .............................................. A47G 7/00
(52) U.S. Cl. ....................................................... 47/39
(58) Field of Search ............................ 47/39, 65, 65.5, 47/66.1, 66.7, 71; 15/261, 264; 220/23.4; 280/79.2, 79.5

(56) References Cited

U.S. PATENT DOCUMENTS

| | | | | |
|---|---|---|---|---|
| 585,931 A | * | 7/1897 | Gridley | 47/39 |
| 896,050 A | * | 8/1908 | Zwemer | 280/43.14 |
| 1,820,843 A | | 8/1931 | Spitz | |
| 2,379,476 A | * | 7/1945 | Cleveland | 280/43.15 |
| 3,041,782 A | | 7/1962 | Bachman | 47/39 |
| 3,263,765 A | * | 8/1966 | Just | 180/19.1 |
| 3,528,676 A | | 9/1970 | Marcandalli | 280/79.2 |
| 3,676,953 A | | 7/1972 | Delogne | |
| 4,025,053 A | * | 5/1977 | Stickle, Jr. | 254/122 |
| 4,219,186 A | * | 8/1980 | Brewer | 254/9 C |
| 4,313,612 A | * | 2/1982 | Rubens | 280/79.5 |
| 4,583,323 A | | 4/1986 | Graves et al. | 47/67 |
| 4,638,595 A | | 1/1987 | Rivero | 47/39 |
| 4,943,034 A | * | 7/1990 | Wagnon | 254/122 |
| 4,969,290 A | | 11/1990 | Skoretz | 47/39 |
| 5,002,293 A | * | 3/1991 | Gottselig | 280/47.35 |
| 5,094,031 A | | 3/1992 | Lee | 47/66 |
| 5,309,670 A | | 5/1994 | Bates | 47/71 |
| 5,551,715 A | * | 9/1996 | Pickard | 280/43.24 |
| 5,950,358 A | | 9/1999 | Commenator | 47/39 |
| 6,128,853 A | | 10/2000 | Klonel et al. | 47/39 |
| 6,385,899 B1 | * | 5/2002 | Treganza | 47/39 |

* cited by examiner

Primary Examiner—Charles T. Jordan
Assistant Examiner—Francis T. Palo
(74) Attorney, Agent, or Firm—Kinney & Lange, P.A.

(57) ABSTRACT

The present invention is a plant support comprising a horizontal base for supporting a plant, a mobilizing mechanism positioned beneath the base which is vertically extendable from the base and vertically retractable toward the base, and a mechanism housing wall extending down from the base. Preferably, when the mobilizing mechanism is in a retracted position, the bottom of the mobilizing mechanism and the bottom of the mechanism housing wall are at substantially the same vertical position. The plant support optionally has a pot wall extending up from a perimeter of the horizontal base.

9 Claims, 5 Drawing Sheets

PLANT MOBILIZER

CROSS-REFERENCE TO RELATED APPLICATION(S)

None.

BACKGROUND OF THE INVENTION

This invention relates to a plant, shrub, or tree support or pot which allows for mobility of the plant contained therein. In particular, the invention relates to a plant mobilizer in which casters, wheels, rollers, or the like extend and retract from the bottom of the mobilizer, thereby offering mobility while the pot is being moved, and stability while the pot is stationary.

It is common to move plants around a building or landscape setting to change the aesthetic appearance of a room, dwelling, or landscape; to rotate or move the plants so they can receive sunlight; or for any other purpose. Very large plants in particular pose the problem of being very difficult to move because of their size and weight. One solution to this problem consists of using lighter weight materials in the construction of plant pots. For example, large plastic pots may be found which imitate the look of much heavier terra cotta or clay pots. However, even these lighter weight plastic pots become very heavy with the addition of soil, water, and plant material.

Thus, various prior art teachings show the use of pot transporting devices or stands featuring wheels or casters. Such uses are shown by Rivero, U.S. Pat. No. 4,638,595; Lee, U.S. Pat. No. 5,094,031; Spitz, U.S. Pat. No. 1,820,843; Delogne, U.S. Pat. No. 3,676,953; Bates, U.S. Pat. No. 5,309,670; and Commenator, U.S. Pat. No. 5,950,358. However, a problem with such devices is that they may be unstable while stationary. This instability may be contributed to a number of factors. First, the use of the casters or wheels raises the center of gravity of the potted plant, thereby making it easier for the plant to tip when blown by the wind or accidentally nudged. Second, the surface area of the wheels or casters in contact with the ground is quite small in comparison to the mass supported by the wheels or casters. This not only leads to instability, but also increases the chances that the wheels will sink into the ground under the weight of the potted plant, thereby making it very difficult to move the plant from its location. Third, if the potted plant is placed on an uneven surface, such as an incline, the plant may inadvertently roll from the desired location.

Finally, wheels do not generally add to the aesthetic value of a potted plant. Various prior art patents have taught apparatuses which attempt to camouflage the appearance of such wheels. These teachings include patents by Bachman, U.S. Pat. No. 3,041,782; Marcandalli, U.S. Pat. No. 3,528,676; Skoretz, U.S. Pat. No. 4,969,290; and Klonel, et al., U.S. Pat. No. 6,128,853. One attempt at solving the stated problems of the use of wheels is taught by Gridley in U.S. Pat. No. 585,931. While the Gridley invention does address the problems of tipping, sinking, rolling, and undesirable wheel appearance, it does present additional problems of its own. For example, the large handle used for mobility is aesthetically unpleasing when attached to the support, and may be easily lost if not attached to the support. Additionally, each time the pot support is moved, the support must first be wheeled out of the base plate, the base plate then repositioned at the desired location, and then the pot wheeled back into the base plate. This process requires the user to make multiple trips back and forth to place each part of the pot support.

Thus, there remains a need for a plant pot or support which is easily movable yet avoids the traditional problems associated with the use of the wheels, including tipping, sinking, rolling, and undesirable aesthetics. In addition, the pot or support should be easy to use, and is preferably unitary, without detachable parts which may become lost or misplaced as the unit is moved from place to place.

BRIEF SUMMARY OF THE INVENTION

The present invention is a plant support comprising a horizontal base for supporting a plant, a mobilizing mechanism positioned beneath the base which is vertically extendable from the base and vertically retractable toward the base, and a mechanism housing wall extending down from the base. Preferably, when the mobilizing mechanism is in a retracted position, the bottom of the mobilizing mechanism and the bottom of the mechanism housing wall are at substantially the same vertical position. The plant support optionally has a pot wall extending up from a perimeter of the horizontal base.

DETAILED DESCRIPTION OF THE PREFERRED EMBODIMENT

The present invention is a plant support and mobilizer which overcomes the disadvantages of the prior art by offering mobility while the plant is being moved, stability while the pot is stationary, and a unitary design which is durable and easy to use. While the preferred embodiment is shown as a pot, it is also contemplated that the teachings of this invention may be adapted to various other plant support structures, such as stands or bases to be used with separate pots.

The present invention comprises a structure having a mobilizing mechanism such as wheels, casters, rollers, or the like which extend and retract substantially vertically from the base of the plant support. Any known mechanism may be used to extend and retract the wheels, casters or rollers from the bottom of the structure. The mechanism may be mechanical, hydraulic, pneumatic, electrical or may have a motorized feature. The mechanism may be activated, for example, by turning a switch, stepping on a pedal, or turning a handle.

Figure 1:
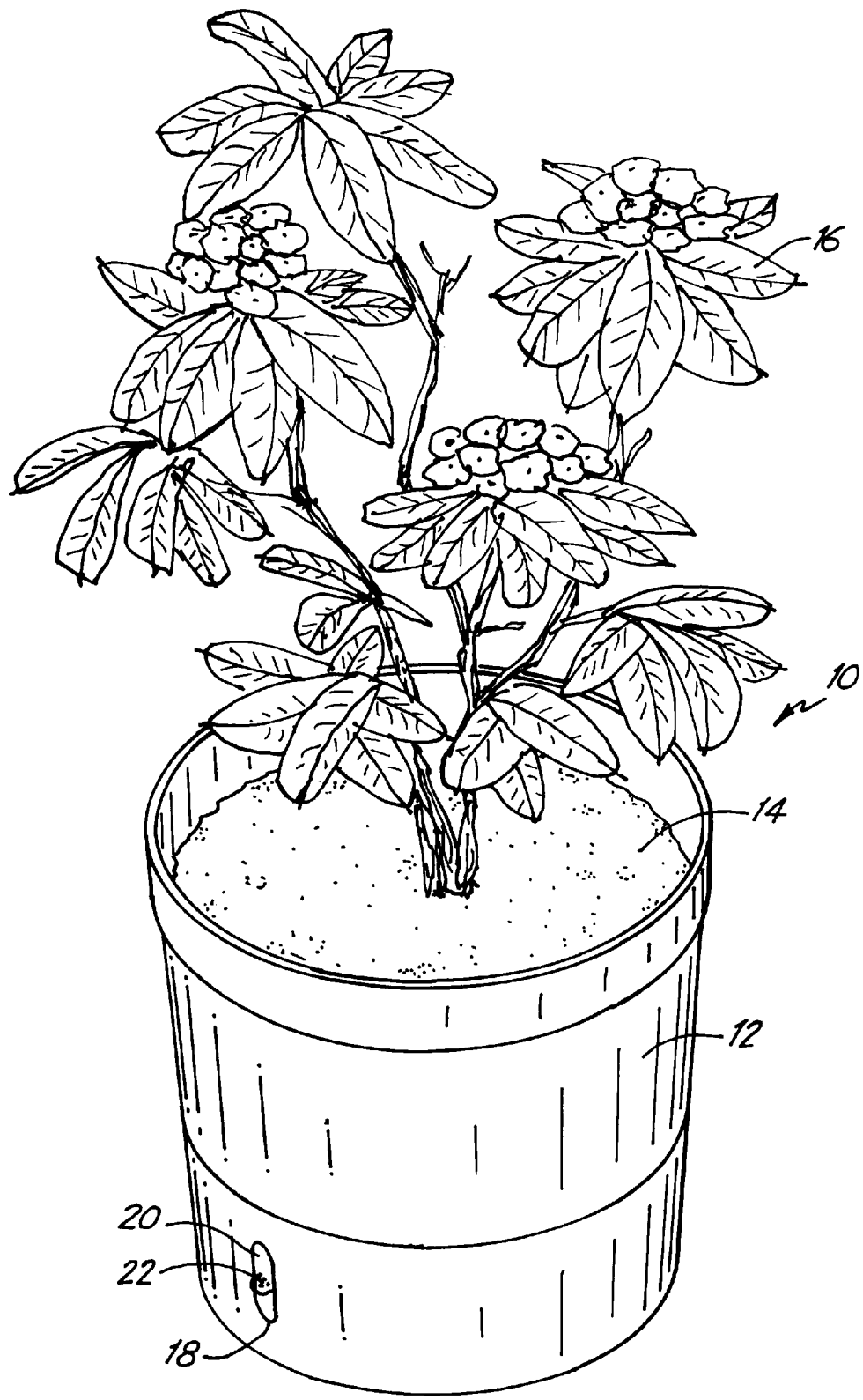
FIG. 1 is a perspective view of a preferred embodiment of the mobilizer of the present invention.

FIG. 1 is a perspective view of a preferred embodiment of plant support and mobilizer 10. Mobilizer 10 includes pot 12 which contains soil 14 and plant 16. The body of pot 12 is preferably molded from a plastic material which is lightweight, economical, durable, easy to clean, and able to imitate the appearance of other materials. It is contemplated that a wide range of other material may also be used, including, for example and without limitation, metal, wood, concrete, stone, and clay. Pot 12 includes slot 18 for access to actuating mechanisms which will be explained with reference to later figures. Slot 18 is closed by plug 20 in a preferred embodiment to lend a more finished aesthetic to pot 12. Plug 20 may be a snap-fit plug with grip handle 22, as shown. Alternatively, the closure for slot 18 may comprise, for example, a sliding, pivoting, or hinged closure. In a preferred embodiment, plug 20 is attached to pot 12 so that it will not be lost or misplaced when removed from slot 18.

Figure 2:
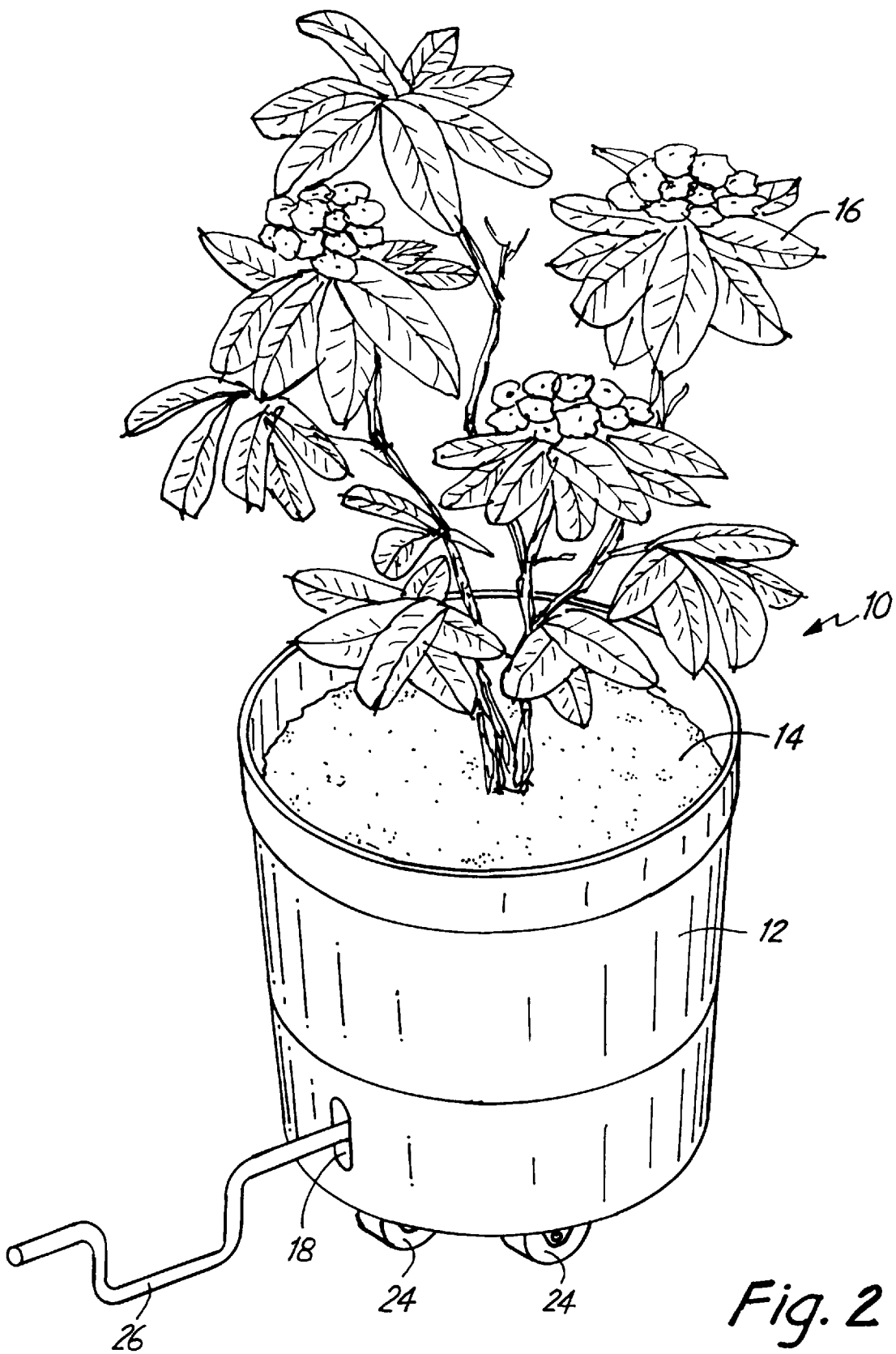
FIG. 2 is a perspective view of the embodiment of FIG. 1, showing the mobilizer in a raised position.

FIG. 2 is a perspective view of mobilizer 10, raised on casters 24. Casters 24 extend down from the bottom of pot 12 to raise pot 12 from a ground surface, thereby allowing movement of mobilizer 10 on casters 24. Each caster 24 is preferably rated for at least 100 pounds of load. The mechanisms for the raising and lowering of pot 12 with respect to casters 24 can be actuated by a user through slot 18. In one embodiment, a user first grasps plug 20 (shown in FIG. 1) by plug grip 22 and pulls to thereby remove plug 20. The user can then insert crank handle 26 through slot 18, thereby engaging an actuating mechanism within pot 12. By rotating crank handle 26, the user can raise and lower pot 12 on casters 24.

Figure 3:
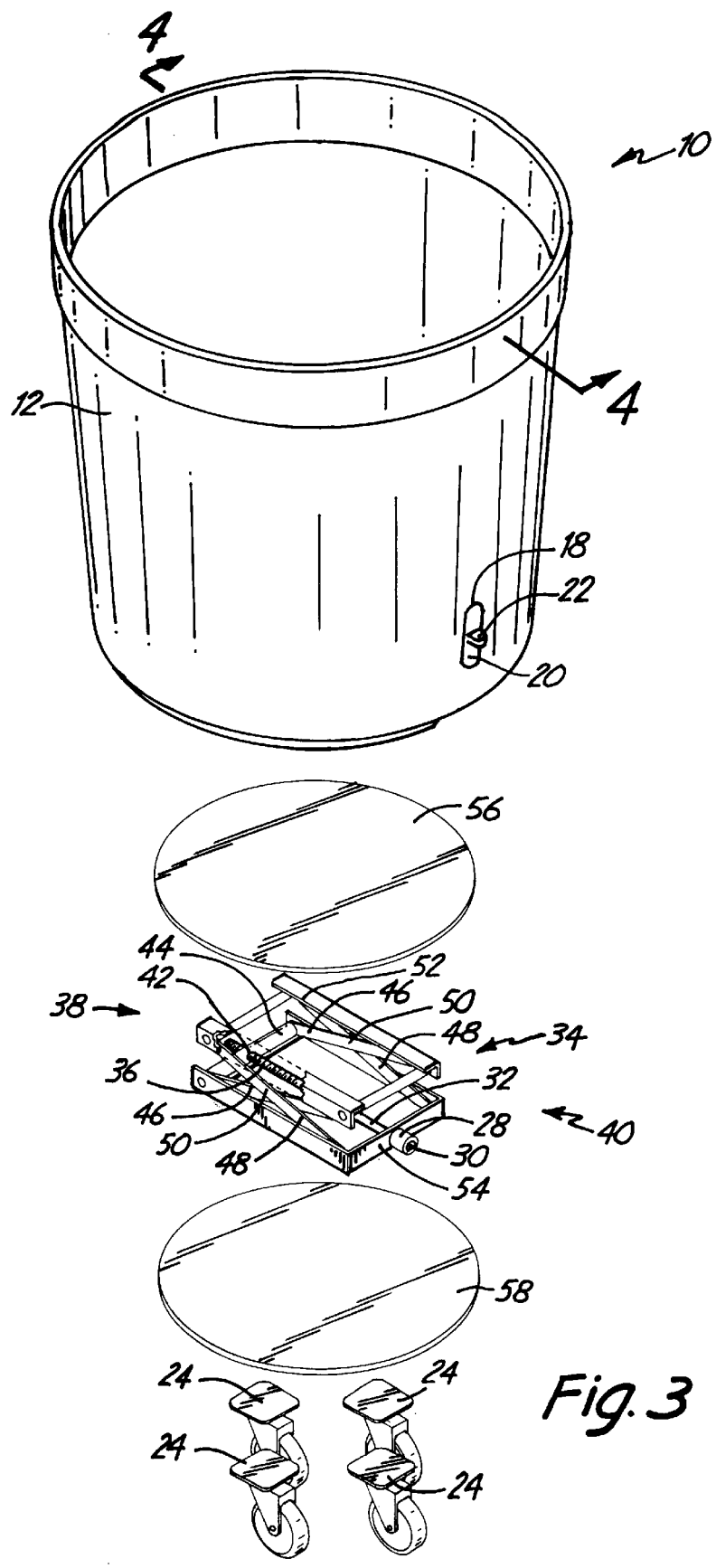
FIG. 3 is an exploded perspective view of a preferred embodiment of the mobilizer of the present invention.

FIG. 3 is an exploded perspective view, showing the components of a preferred embodiment of the present invention. To raise and lower pot 12, a user inserts crank handle 26 of FIG. 2 through slot 18 to engage drive stub 28. The end of crank handle 26 mates closely with hole 30 of non-circular cross-section in drive stub 28. Drive stub 28 is fixedly attached to an end of shaft 32 of scissor jack assembly 34. The components of scissor jack assembly 34 are preferably made of a durable and inexpensive material such as steel, or a durable, corrosion-resistant material such as plastic, titanium, stainless steel, aluminum or fiber-reinforced polymers or composites. Shaft 32 includes threaded end 36 opposite drive stub 28. For purposes of the discussion, we will refer to rear end 38 and front end 40. Externally threaded end 36 passes through internally threaded bore 42 in rear cross piece 44.

Inside scissor legs 46 are pivotally attached to rear cross piece 44. Outside scissor legs 48 are pivotally attached to inside scissor legs 46 at intersections 50. Outside scissor legs 48 are also pivotally attached at front end 40 to bottom frame 54. Inside scissor legs 46 are pivotable and slidably mounted to top frame 52. Outside scissor legs 48 are pivotally attached to top frame 52. Inside scissor legs 46 are not attached to bottom frame 54, thereby allowing for relative lateral movement of rear cross piece 44. It is important to note that while both ends of outside scissor legs 48 are laterally fixed, both ends of inside scissor legs 46 are able to slide laterally with respect to top frame 52 and bottom frame 54. As scissor assembly 34 opens, thereby extending casters 24, the top ends of inside scissor legs 46 slide toward the rear 38. Simultaneously, the bottom ends of inside scissor legs 46, as well as rear cross piece 44, slide forward toward front 40 along threaded end 36 of shaft 32.

When a user turns crank handle 26 of FIG. 2, drive stub 28, and therefore shaft 32 rotate with crank handle 26. Rotation of shaft 32 causes movement of rear cross piece 44 along threaded end 36 of shaft 32. As rear cross piece 44 moves forward along threaded end 36, scissor assembly 34 opens, i.e., top frame 52 moves away from bottom frame 54. Because inside scissor legs 46 are pivotally connected to outside scissor legs 48 at intersections 50, the top ends of inside scissor legs 46 simultaneously slide toward rear 38. When crank 26 is rotated in the opposite direction, rear cross piece 44 moves along threaded end 36 of shaft 32 toward rear end 38 of scissor assembly 34. As it does so, the top ends of inside scissor legs 46 slide forward again and scissor assembly 34 retracts into a flattened configuration.

In a preferred embodiment, top plate 56 is mounted onto top frame 52, and bottom plate 58 is mounted onto bottom frame 54. Top plate 56 may be mounted onto pot 12 by any known means; for example, with the use of fasteners such as screws or bolts and nuts. Washers may be used to reinforce such connections. Bottom plate 58 provides a convenient surface for the mounting of casters 24. Bottom plate 58 may be eliminated, and casters 24 may be mounted directly onto bottom frame 54. However, the use of bottom plate 58 allows casters 24 to be distributed more symmetrically under pot 12. Casters 24 may be mounted onto bottom plate 58 by any known means, such as with the use of fasteners, adhesives, or weldments. Washers may be used to reinforce such connections. When all of the components of FIG. 3 are assembled, the opening or extension of scissor assembly 34 causes casters 24 to extend downward from pot 12. In the opposite manner, the collapse or flattening of scissor assembly 34 causes casters 24 to retract back underneath pot 12.

Walking through the steps of operation, a user will encounter a pot that is initially in the state illustrated in FIG. 1, with casters 24 retracted under pot 12, so that mobilizer 10 rests stably upon a ground surface. To move mobilizer 10, a user moves plug 22, inserts crank handle 26 through slot 18 into hole 30 of drive stub 28, and turns crank handle 26. The rotation of crank handle 26 in one direction causes rear cross piece 44 to move forward along threaded end 36 of shaft 32. As rear cross piece 44 moves forward, connected inside scissor legs 46 cause scissor assembly 34 to open, thereby extending casters 24 and causing pot 12 to lift with respect to the ground surface. This lifted position is illustrated in FIG. 2. The user can then easily rotate or wheel mobilizer 10 to a new location. To return mobilizer 10 to the stable configuration of FIG. 1, the user then cranks handle 26 in the opposite direction. This causes rear cross piece 44 to travel rearward along threaded end 36 of shaft 32. Thus, inside scissor legs 46 move to collapse scissor assembly 34, thereby retracting casters 24 and lowering pot 12 back to ground level. Plug 22 can be replaced, and mobilizer 10 will reassume the configuration illustrated in FIG. 1.

Typically, mobilizer 10 will not stay in the raised position of FIG. 2 for extended period of time. Normally, it will be in that position only long enough to be rotated or moved to a new position or location. In that case, no locking mechanism is required to keep scissor assembly 34 in the extended position, because the friction between its components, especially between externally threaded end 36 of shaft 32 and internally threaded bore 42 of rear cross piece 44 is usually enough to keep scissor assembly 34 in the raised position for the necessary period of time.

While extended rod crank 26 is shown, it is contemplated that any rotating mechanism may be used. For example, it may be desirable to provide a crank or handle which can be stored with or within mobilizer 10, thereby adding to the user's convenience. The crank or handle may also be attached to pot 12, so that it cannot be lost. The crank or handle may be of any suitable shape or configuration. Drive stub 28 may also be rotated by, for example, a ratchet wrench or powered screwdriver.

Figure 4A:
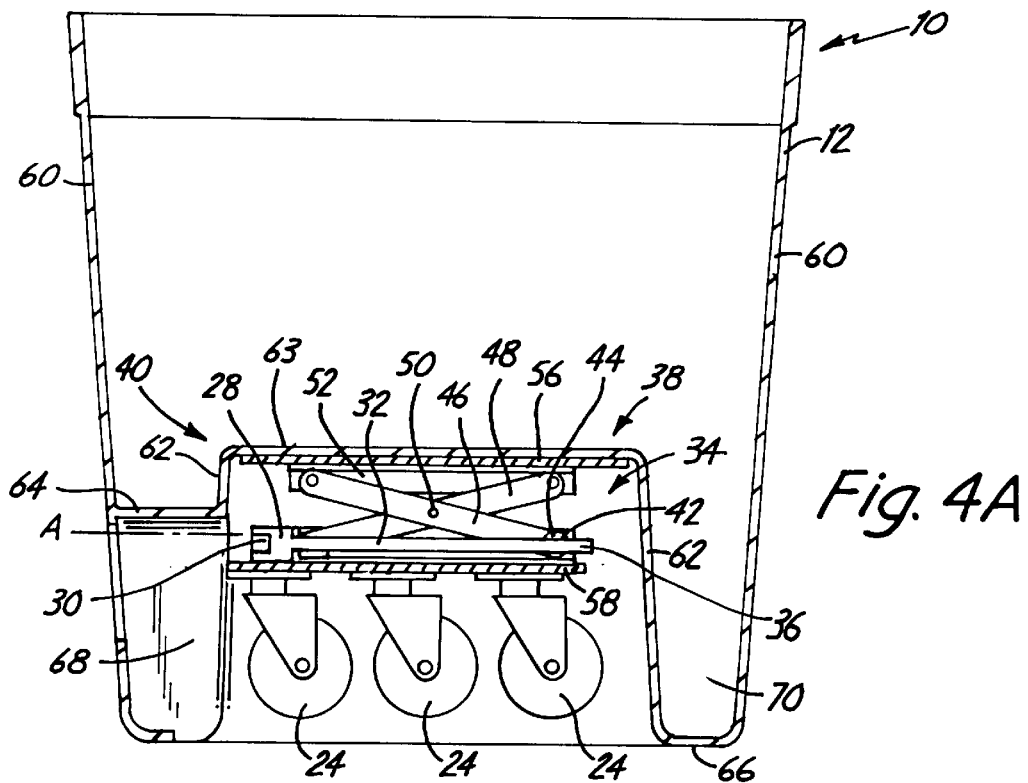
FIG. 4A is a sectional elevation view taken along line 4—4 of FIG. 3, showing a preferred embodiment of the present invention with the wheels retracted.

FIG. 4A is a cross-sectional elevation view of a preferred embodiment of the present invention, taken along line 4—4 of FIG. 3. FIG. 4A depicts mobilizer 10 with casters 24 retracted into pot 12, as shown in FIG. 1. FIG. 4A additionally shows exterior pot walls 60, vertical interior housing walls 62, horizontal interior housing wall 63, base wall 64 over slot 18, and base wall 66 around the remaining perimeter of pot 12. Horizontal interior housing wall 63 provides a base for supporting plant 16 (shown in FIG. 1). Base wall 64 is raised relative to base wall 66, allowing for recess 68, which accommodates the passage of crank shaft 26 through slot 18 and into hole 30 of drive stub 28. In a preferred embodiment, interior walls 62 are spaced from exterior walls 60 to form soil holding area 70. When filled with soil 14 or other material, soil holding area 70 enhances the stability of mobilizer 10 by lowering the center of gravity of the filled mobilizer unit. While casters 24 are shown as retracted above a ground surface, they may also be retracted to a level even with the ground surface. The ground contact of casters 24 as well as base wall 66 distributes the weight of mobilizer 10 and its contents to minimize the sinking of mobilizer 10 into a soft ground surface.

Figure 4B:
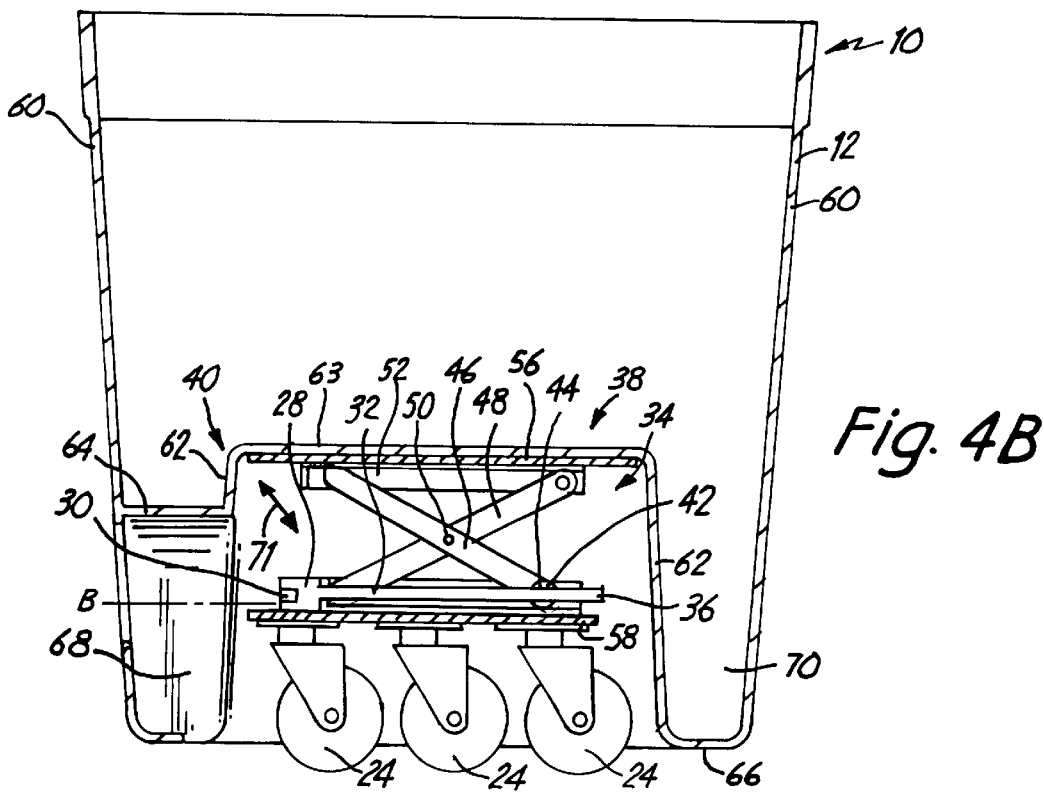
FIG. 4B is a sectional elevation view taken along line 4—4 of FIG. 3, showing a preferred embodiment of the present invention with the wheels extended.

FIG. 4B is an cross-sectional elevation view, taken along lines 4—4 of FIG. 3, and showing casters 24 extended under pot 12, as in FIG. 2. It is important to note that slot 18 must be long enough to accommodate the vertical travel of crank shaft 26 between retracted position A in FIG. 4A, and extended position B in FIG. 4B. As discussed earlier, outside scissor legs 48 are pivotally attached to top frame 52 and bottom frame 54. Thus, the movement of casters 24 follows a slightly canted path indicated by arrow 71. The term "substantially vertical" is defined as including such a canted path as well as a truly vertical path.

Figure 5:
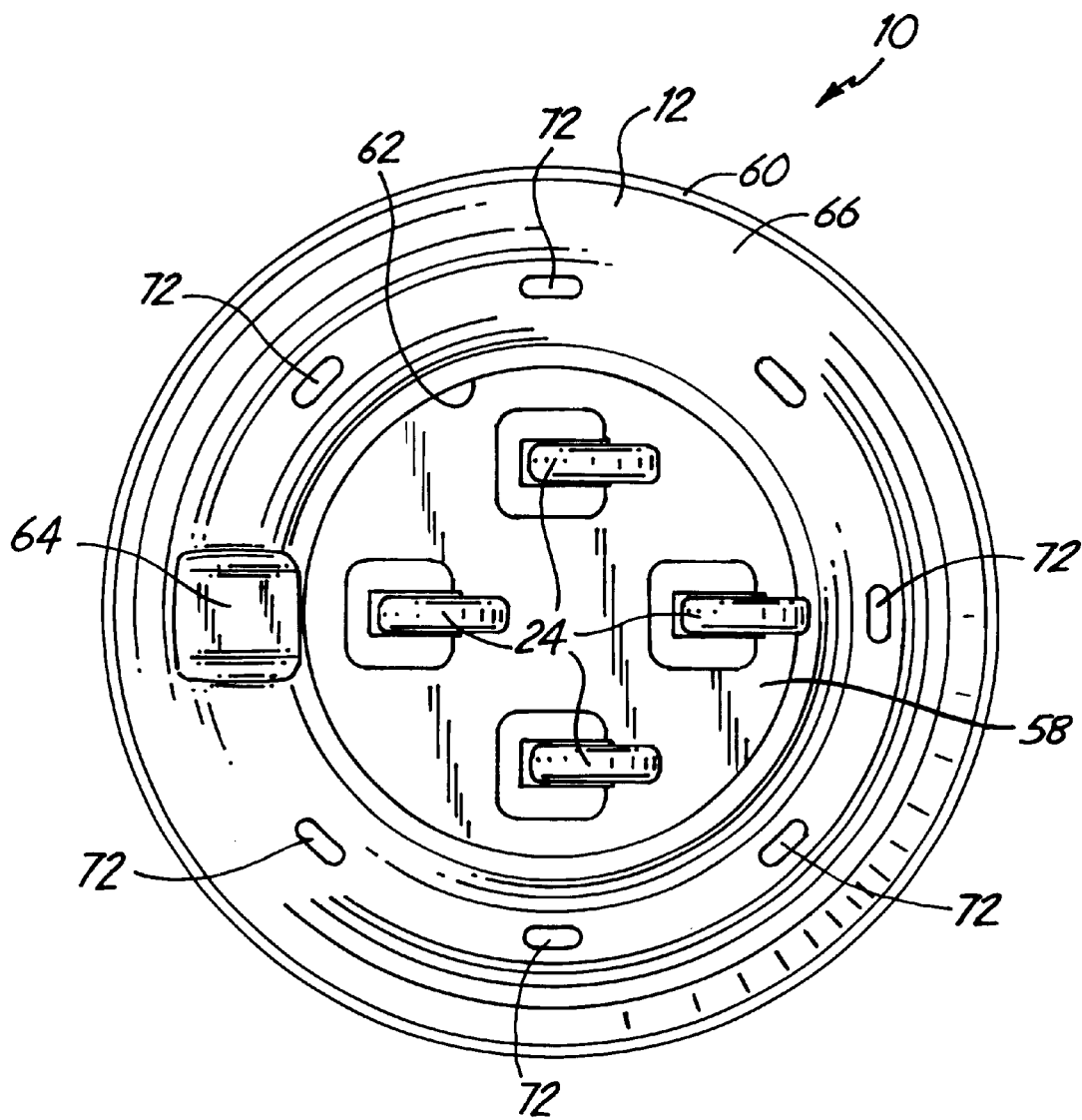
FIG. 5 is a bottom plan view of a preferred embodiment of the mobilizer of the present invention.

FIG. 5 is a bottom plan view of a preferred embodiment of the present invention. FIG. 5 additionally shows a plurality of drain holes 72 disposed along a bottom surface of base wall 66. Interior housing walls 62 and base walls 64 and 66 preferably isolate scissor jack assembly 34 from the contents of pot 12, thereby shielding the actuating mechanism from soil, moisture, and debris. Casters 24 are preferably mounted on bottom plate 58 symmetrically and as far from each other as possible, to provide a wide and stable base upon which mobilizer 10 can move.

Although the description of the preferred embodiment has been quite specific, it is contemplated that various modifications could be made without deviating from the spirit of the invention. Accordingly, it is intended that the scope of the present invention be dictated by the appended claims rather than by the description of the preferred embodiment. For example, while one mechanism of extending and retracting the casters is taught, it is contemplated that other mechanisms may be used, such as electric, hydraulic, pneumatic, and/or other types of jacks. Additionally, while casters are shown, it is contemplated that rollers, coasters, ball wheels, and other mobilizing structures maybe used. These structures preferably allow for rotational as well as translational movement. Furthermore, while four casters are shown connected to a single jack screw scissor assembly, it is contemplated that fewer or more mobilizing structures in different configurations with different extending and retracting mechanisms may be used. Additionally, mobilizer 10 and its components may be constructed of any suitable material and of any suitable size. Additionally, while it is shown that the casters extend and retract in a vertical direction, there may be also be a horizontal component to the motion. For example, the wheels may spread farther apart as they extend, thereby resulting in a wider and therefore more stable base for movement. Moreover, the structure may be provided with one or more handles to facilitate movement.

In summary, the present invention offers a plant pot or support having a base that contacts the ground when the pot or support is in a non-mobile state and mobilizing mechanisms, wherein there is relative vertical movement between the bottom surface of the base and the bottom surface of the mobilizing mechanisms. In a preferred embodiment, casters extend down with respect to the base, thereby allowing a user to easily move or rotate the plant as desired. The casters also retract back up with respect to the base, thereby hiding aesthetically unpleasing wheels, preventing inadvertent rolling or tipping, and minimizing sinking. Although the present invention has been described with reference to preferred embodiments, workers skilled in the art will recognize that changes may be made in form and detail without departing from the spirit and scope of the invention. For example, the important aspect of the invention is the relative vertical movement between the bottom surface of the base and the bottom surface of the casters. In an alternative embodiment, the casters may remain vertically stationary, and the base may actually move up and down vertically, as in the case of a sleeve circumscribing the perimeter of the pot or support. The sleeve may be lifted to expose the casters and thereby allow movement. Once the pot or support is relocated, the sleeve may be lowered to prevent further unintentional rolling.

What is claimed is:

1. A plant support comprising:

a horizontal base for supporting a plant;

a mobilizing mechanism positioned beneath the base, the mobilizing mechanism having a bottom surface;

a mechanism housing wall circumscribing the mobilizing mechanism, the mechanism housing wall having a bottom surface, wherein the bottom surface of the mechanism housing wall is substantially vertically movable with respect to the bottom surface of the mobilizing mechanism; and a pot wall extending above the base, the pot wall cooperating with the horizontal base to define a chamber for containing a mass of soil and a plant disposed within the mass of soil;

wherein the mobilizing mechanism is sufficiently strong to operate under a load of the horizontal base, the mechanism housing wall, the pot wall, the mass of soil, and the plant.

2. The plant support of claim 1 in which the mobilizing mechanism comprises a plurality of castors.

3. The plant support of claim 1 further comprising:

an actuating mechanism for producing the relative vertical motion between the bottom surface of the mechanism housing wall and the bottom surface of the mobilizing mechanism.

4. The plant support of claim 3 wherein the actuating mechanism comprises a scissor jack assembly.

5. The plant support of claim 4 wherein the scissor jack assembly is actuated by rotation of the jack screw.

6. The plant support of claim 5 further comprising a handle, wherein rotation of the handle rotates the jack screw.

7. A plant support comprising:

a horizontal support for a plant:
  a mobilizing mechanism positioned beneath the base, the mobilizing mechanism being substantially vertically extendable from the base and substantially vertically retractable toward the base;
  a scissors assembly for extending and retracting the mobilizing mechanism;

a mechanism housing wall extending down from a perimeter of the horizontal base; and a pot wall circumscribing the mechanism housing wall and extending above the horizontal base, the pot wall cooperating with the horizontal base to define a chamber for containing a mass of soil and a plant disposed within the mass of soil;

wherein the mobilizing mechanism and the scissors assembly are sufficiently strong to operate under a load of the horizontal base, the mechanism housing wall, the pot wall, the mass of soil and the plant.

8. The plant support of claim 7 wherein the scissor jack assembly is actuated by rotation of a jack screw.

9. The plant support of claim 8 further comprising a handle, wherein rotation of the handle rotates the jack screw.

* * * * *